United States Patent [19]

Cranna

[11] 4,335,858
[45] Jun. 22, 1982

[54] APPARATUS FOR THREADING TAPE OVER A TAPE PATH INCLUDING A CHANNEL CONFORMING TO SAID PATH

[75] Inventor: Darlene K. N. Cranna, 9800 E. Rosewood St., Tucson, Ariz. 85710

[73] Assignee: International Business Machines Corporation, Armonk, N.Y.

[21] Appl. No.: 164,732

[22] Filed: Jun. 30, 1980

[51] Int. Cl.³ .......................... G03B 1/04; G03B 1/56; G11B 15/32
[52] U.S. Cl. ..................................... 242/195; 226/91; 242/76
[58] Field of Search ................. 242/76, 195, 201, 206, 242/208–210; 226/91, 191, 11; 352/157, 158

[56] References Cited

U.S. PATENT DOCUMENTS

| | | | |
|---|---|---|---|
| 3,119,574 | 1/1964 | Laa | 242/195 |
| 3,403,867 | 10/1968 | Kleist | 226/191 X |
| 3,848,263 | 11/1974 | Nagaoka | 360/83 |
| 3,934,840 | 1/1976 | Inaga | 242/195 |
| 4,059,211 | 11/1977 | Brizzolara | 226/11 |

*Primary Examiner*—Leonard D. Christian
*Attorney, Agent, or Firm*—R. E. Cummins

[57] ABSTRACT

An automatic threading apparatus for a magnetic tape transport is disclosed in which a flexible sprocketed guide tape loop is disposed in a continuous guide channel which is shaped to conform to the shape of the complex tape path extending from the supply reel to the take-up reel of the magnetic tape transport. The guide tape is driven by a sprocketed gear to move in sliding engagement with the continuous channel in either direction to move a leader block coupling device attached to the sprocket tape from a first position adjacent the supply reel where the leader block is coupled and decoupled from the device to a second position associated with the take-up reel where the leader block is maintained coupled to the device and caused to rotate relative thereto by and with the take-up reel during a winding operation.

5 Claims, 7 Drawing Figures

APPARATUS FOR THREADING TAPE OVER A TAPE PATH INCLUDING A CHANNEL CONFORMING TO SAID PATH

DESCRIPTION

This invention relates in general to automatic web threading apparatus and, in particular, to an improved threading apparatus for use with a magnetic tape transport which includes a replaceable cartridge containing a supply reel of magnetic tape and a nonreplacable take-up reel on which the tape is wound.

BACKGROUND OF THE INVENTION

The present invention is an improvement over the automatic tape threading apparatus disclosed and claimed in copending application Ser. No. 164,733, filed concurrently herewith and assigned to the assignee of the present invention. In this copending application, an automatic threading apparatus is disclosed which comprises basically a coupling device and a mechanism for moving the coupling device over a predetermined nonlinear tape path extending between the tape supply reel and the take-up reel of a magnetic tape transport. The function of the coupling device is to selectively engage a leader block which is permanently attached to the end of the tape wound on the supply reel that is disposed in a generally rectangular cartridge.

The take-up reel of the disclosed tape transport is provided with a radially disposed leader block receiving slot which receives the leader block and positions the tape attached to it in a pre-wrap relationship with the hub of the take-up reel. The leader block and the hub are, thus, rotated together during a tape winding and unwinding operation. The coupling device is designed so as to remain coupled to the leader block during the winding and unwinding operation and also to remain attached to the mechanism which has moved it from the position adjacent to the supply reel to the position associated with the take-up reel. As described in the copending application, the coupling device includes a pin disposed with its axis parallel to the axis of rotation of the supply and take-up reels. The pin engages the leader block in a manner which permits the pin to be disposed coaxially with the axis of the take-up reel when the leader block is positioned in the radially extending slot of the take-up reel. The engagement of the pin and leader block is such that the leader block is free to rotate about the pin during the winding and unwinding process. Alternately, the pin could be coupled to the leader block in a manner to cause the pin to rotate on its axis with the leader block by providing suitable bearing elements in the coupling device. In the embodiment of the invention shown in the copending application, the coupling device is permanently attached to a band member which engages a plurality of pulleys, one of which is driven by a suitable motor. The placement of the axis of rotation of the pulleys and their respective diameters are selected to cause a segment of the band to coincide with the tape path over which the tape normally passes from the supply reel to the take-up reel. Rotation of the driven pulley causes movement of the band, the coupling device, the leader block and attached tape through the tape path, and results in automatic threading of the tape.

It has been found that as the tape path becomes more complex in the sense that it involves compound curves with relatively small radii, the pulley-band guiding arrangement becomes somewhat unwieldy and often imposes constraints on the tape path which provides for less than optimum tape transport performance.

The present invention is directed to a relatively simple mechanism for moving the coupling device between the supply reel and the take-up reel which can accommodate rather complex tape paths. The mechanism comprises a continuous channel shaped member, one section of which is formed to coincide approximately with the tape path, and the remaining section of the channel merely being returned to the beginning of the section by some convenient path. A continuous band is disposed in the channel for sliding engagement therewith, and suitable means are provided to drive the band in a forward and reverse direction. Means are also provided for attaching the coupling device to the band whereby the movement of the coupling device moves the leader block over the complex path defined by the channel and threads the tape to the take-up reel.

It is, therefore, an object of the present invention to provide an improved automatic tape threading mechanism.

Another object of the present invention is to provide an improved automatic tape threading mechanism for use with a magnetic tape transport in which the tape path can have various degrees of complexity.

A still further object of the present invention is to provide a relatively simple and inexpensive mechanism for moving a leader block coupling device of an automatic threading apparatus through a complex tape threading path.

The foregoing and other objects, features and advantages of the invention will be apparent from the following more particular description of a preferred embodiment of the invention as illustrated in the accompanying drawings.

DESCRIPTION OF THE INVENTION

Figure 1:
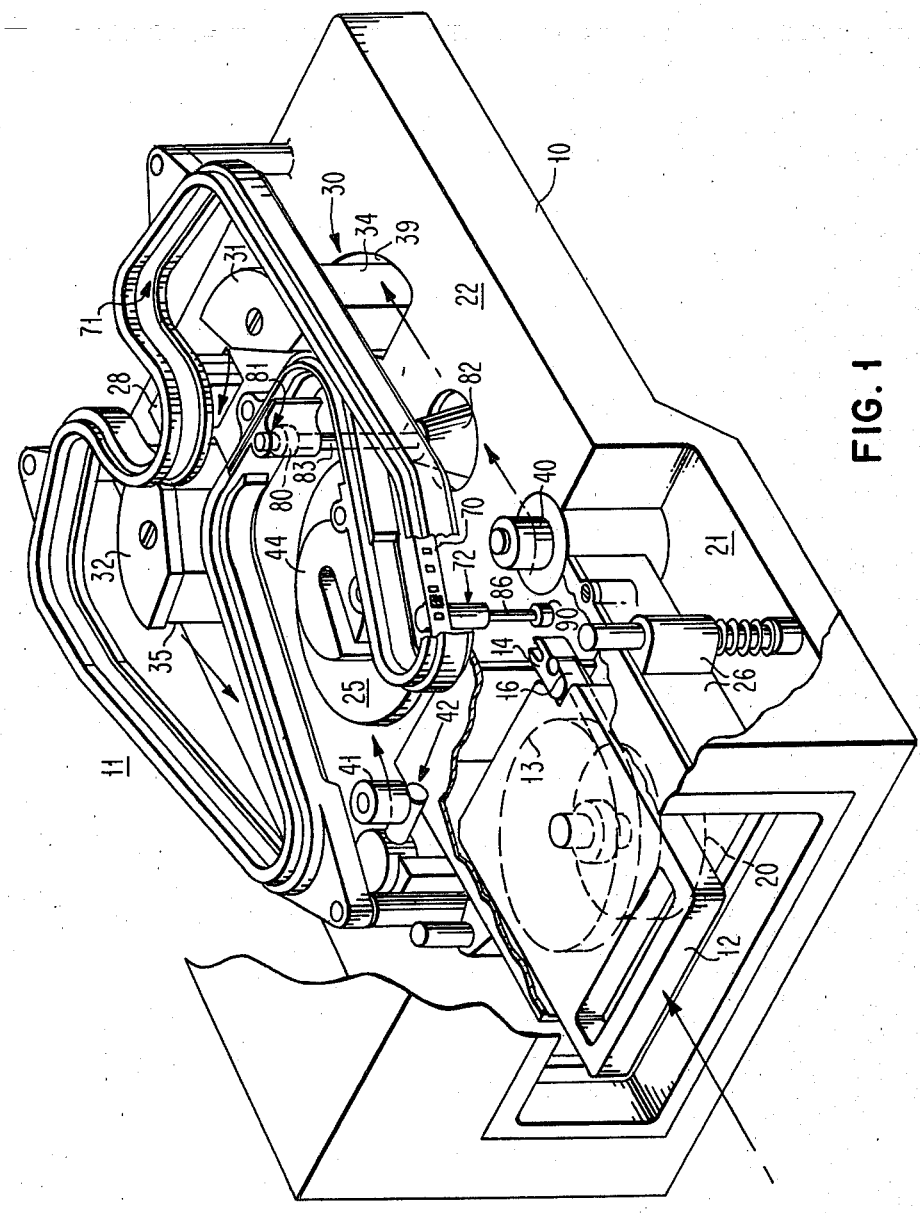
FIG. 1 is a perspective view of a reel-to-reel magnetic tape drive having an automatic threading apparatus embodying the present invention.
Figure 2:
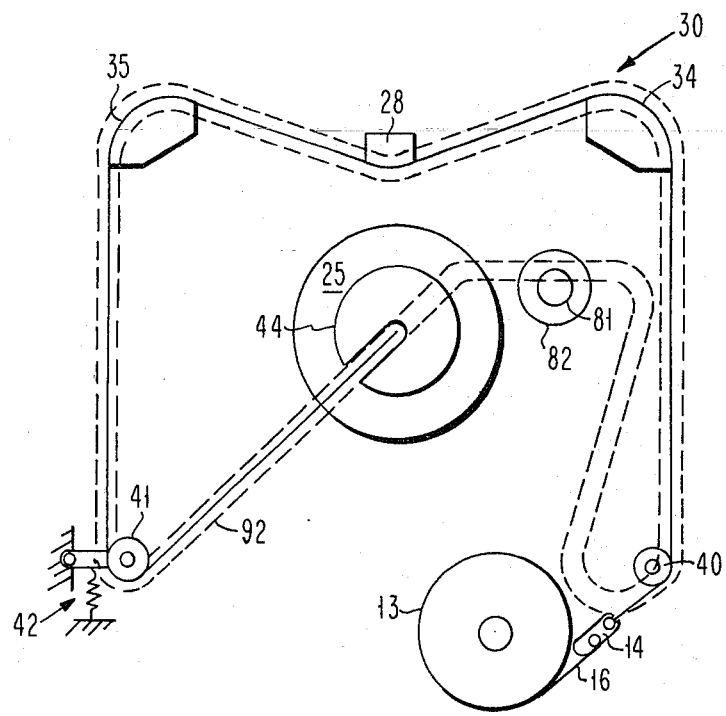
FIG. 2 is a schematic plan view of the continuous guide channel of the threading apparatus shown in FIG. 1 and showing the tape path defined by the various components.

FIG. 1 is a perspective view of a reel-to-reel type magnetic tape drive in which the present invention has been embodied. As shown in FIG. 1 and in the diagrammatic plan view of the drive shown in FIG. 2, the drive consists generally of a tape transport apparatus 9 and the automatic threading apparatus 11. The tape transport apparatus includes a baseplate 10 on which various standard components of a magnetic tape transport are mounted. The supply cartridge 12 is replaceable and contains a reel 13 of magnetic tape 16. A leader block 14 (best shown in FIG. 1) is disposed externally of the cartridge. The leading edge of the tape 16 is attached to the side of the leader block 14. The drive motor 20 for the supply reel 13 is mounted underneath the baseplate 10 so that its shaft extends normal to the surface 21 and slightly above the surface 22 of baseplate 10. The motor shaft is provided with a suitable clutching arrangement which permits the motor to be coupled to the hub of the supply reel 13 by movement of the cartridge 12 in a vertical direction, as shown in FIG. 1 normal to surface 22. As shown, this vertical movement is achieved by the cartridge loading mechanism, a portion of which is designated by reference character 26 in FIG. 1.

The take-up reel 25 is permanently attached to a motor (not shown) which is mounted to the baseplate 10 in a suitable fashion. The supply reel 13, when coupled to its motor, lies in substantially the same plane as the take-up reel 25 so that a point on the tape 16 moves when being transported in a plane normal to both motor shafts. Transfer of the tape 16 between the take-up reel 25 and the supply reel 13 past the magnetic transducer 28 is achieved by control of the respective driving motors for the reels, as is well known in the art.

Magnetic transducer 28 is part of the transducer assembly 30 which includes the guide bearings 31 and 32 disposed on opposite sides of the transducer 28. Guide bearings 31 and 32 are positioned in the tape path so that the uncoated side 16A of the magnetic tape 16 slides over the surfaces 34 and 35 which may be forced air lubricated surfaces.

Transducer assembly 30 is inserted through an opening 39 in the baseplate 10 and securely mounted thereto. The two remaining components which affect the shape of the tape path are the guide 40 and the roller 41 of the tension transducer 42.

Roller guide 40 is mounted on baseplate 10 with its axis parallel to the reel axis. The tension transducer 42 is attached to baseplate 10 so that the axis of the roller 41 is also parallel to the reel axis.

The function of each of the components described above is well-known in the art. Since the specific details of these components form no part of the present invention, they have not been illustrated or described in detail. The details of the leader block 14, the construction of the hub 44 of the take-up reel 25, and the relationship of these elements to each other, is disclosed in copending application Ser. No. 164,733, filed concurrently herewith and assigned to the assignee of the present invention. As discussed in that application, the hub of the take-up reel is provided with a radially extending slot for receiving the end of the leader block which is permanently attached to the end of the tape on the supply reel. The relationship is such that when the leader block is inserted into the slot by a movement of the block in a radial direction, the tape attached thereto is positioned to be wrapped on the hub by merely rotating the take-up reel since the length of the slot corresponds generally to the length of the leader block. During the winding process, the leader block is maintained in the slot of the take-up reel. The automatic threading apparatus disclosed in that application generally provides two functional aspects. The first involves moving and guiding a coupling device from the supply reel to the take-up reel, and the second involves selectively coupling the leader block at the supply reel in a manner to permit the leader block to be rotated with the take-up reel without being uncoupled from the threading apparatus.

The automatic threading apparatus of the present invention performs the same two general functions. The moving and guiding function is implemented, as shown in FIG. 1, by a sprocketed drive flexible tape loop 70 which is disposed in a sliding guiding relationship with a continuous channel 71.

Figure 3:
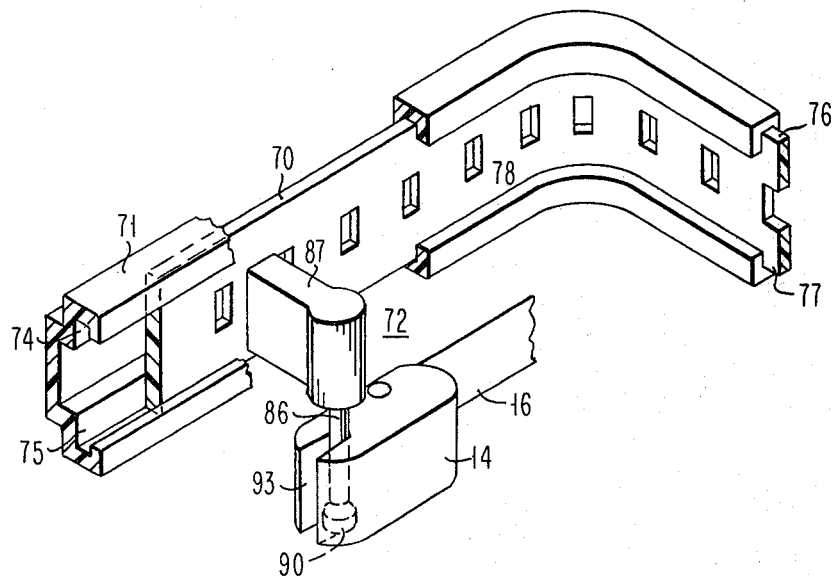
FIG. 3 is a perspective view in section of the channel shown in FIG. 2.
Figure 4:
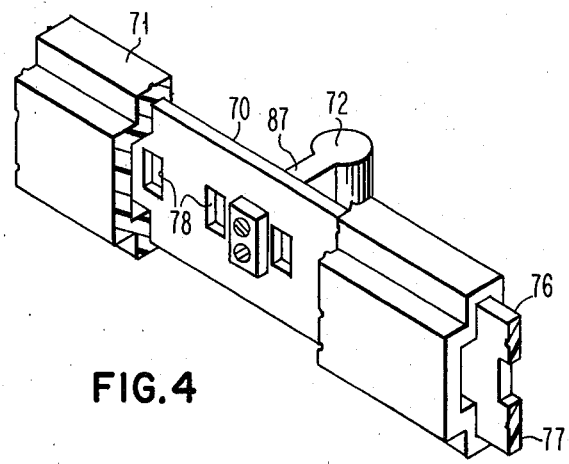
FIG. 4 is a view showing the details of the coupling device and the manner of attaching the coupling device to the guide band and the leader block.

FIG. 3 shows the details of the channel 71 and the sprocketed guide tape 70. FIG. 4 shows the details of the coupling device 72. Channel 71 is provided with upper and lower slots 74 and 75, respectively, in which the upper and lower edges 76 and 77 of the sprocket tape member 70 are disposed. The surfaces of the slots 74 and 75 may be coated with suitable material to reduce any frictional drag on the guide tape 70. The slotted portions of the channel are held in alignment by the integral back portion shaped to provide the necessary rigidity to the channel and allow for the means for connecting the coupling device 72 to the tape 70.

The guide tape 70 is flexible enough along the lengthwise direction to readily conform to the various curves in the channel 71. As shown, the tape is provided with a series of sprocket holes 78 which cooperate with a sprocket gear 80 mounted in a housing 81 attached to the channel 71. A motor 82 drives shaft 83, shown in FIG. 1, to rotate sprocket gear 80 and, hence, move the sprocket tape 70 relative to channel 71.

The coupling device 72, shown in FIG. 3, comprises a coupling pin 86 and a member 87 which is suitably attached to sprocket tape 70 so as to position the axis of the coupling pin 86 substantially parallel to the reel axis. Pin 86 may be permanently secured in member 87 or, alternately, it could be mounted for rotation about its axis relative to member 87. The distal end 90 of the pin 86, which extends below the member 87, may be slightly longer than the axis of the pin receiving opening 93 in leader block 14, or the leader block may be notched at the bottom front edge. When the coupling device 72 is positioned at its home position, as shown in FIG. 1 by movement of the sprocketed tape, leader block 14 is coupled to pin 86 when the cartridge 12, shown in FIG. 1, is inserted into the tape drive and the hub of the supply reel is lowered to engage the supply reel drive motor.

Energizing the sprocket drive motor 82 causes movement of the tape 70, coupling device 72, and leader block 14 towards the take-up reel which has been prepositioned with the radially extending leader block receiving slot aligned parallel to the section 92 of the channel 71. The sprocket drive motor 82 remains energized to move tape 70 until the coupling device 72 has positioned the leader block 14 in the slot of the take-up reel 25. At this point, the axis of pin 86 is coaxial with the axis of rotation of the take-up reel 25 so that the tape transport process over the established tape path may proceed by merely energizing the respective reel drive motors.

The leader block 14 is returned to its initial starting position after the tape 16 has been unwound from the hub of the take-up reel 25 merely by reversing the action of the sprocket drive motor 82 which returns the coupling device 72 to the position shown in FIG. 1.

Figure 5A:
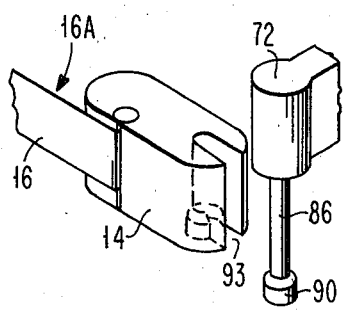
FIGS. 5a through 5c illustrate the relative movements involved in coupling the device to the leader block attached to the tape.
Figure 5B:
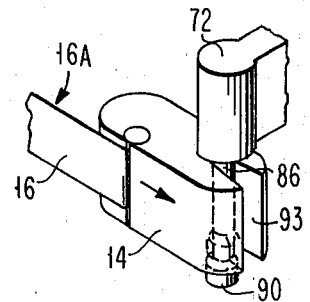
Figure 5C:
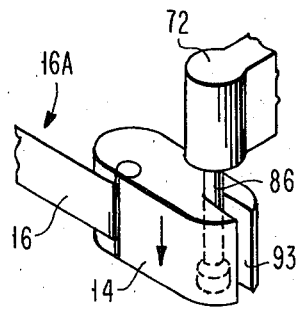

The leader block 14 is decoupled from the pin 86 as a result of unloading the supply reel cartridge. The above loading and unloading operations are shown diagrammatically in FIGS. 5a through 5c.

It will be apparent to persons skilled in the art that various sensing devices may be employed to sense various positions of the mechanical components to insure reliable operation of both the tape threading apparatus and the tape drive. It will also be apparent that various modifications can be made to the specific coupling device shown, while still maintaining its general function of being coupled and uncoupled to the leader block only at the supply reel. It will be obvious to those skilled in the art, also, that the shape of the continuous channel may be modified to correspond to any complex tape path which does not involve the physical intersection of the tape to different segments of the tape path.

While the invention has been particularly shown and described with reference to a preferred embodiment thereof, it will be understood by those skilled in the art that various changes in the form and details may be made therein without departing from the spirit and scope of the invention.

Having thus described my invention, what I claim as new, and desire to secure by Letters Patent, is:

1. In an automatic threading apparatus for moving a leader block attached to the leading end of web material wrapped on a supply reel positioned on a web transport over a complex web path from a first predefined position to a second position which couples said leader block to a take-up reel having a hub disposed on said transport for subsequent conjoint rotational movement with said take-up reel about the axis of rotation of said take-up reel during winding and unwinding of web material on and off said take-up reel, which includes:

a device adapted to selectively couple said leader block to said device at said first predetermined position which permits rotation of said block relative to said device about a first axis parallel to the axis of said reels;

a mechanism for moving said device and said coupled leader block from said first predetermined position to said second position to dispose said first axis coaxially with the axis of said take-up reel and said web material in winding relationship to the hub of said take-up reel, and for guiding said coupling device during movement over a predetermined path which corresponds to said tape path, said mechanism comprising in combination:

a continuous guide band;

a continuous channel member defining a closed path, a major portion of which corresponds to said complex tape path, said channel including upper and lower guide slots for holding upper and lower edges of said guide band for sliding movement relative to said channel;

means for permanently attaching said device to said guide band to permit rotation of a coupled leader block relative to said first axis when said leader block is positioned to rotate with said take-up reel during winding or unwinding of the tape; and means for driving said band lengthwise through said channel in either direction to move said coupling device from a first position adjacent said supply reel to a second position where the coupled leader block is positioned to rotate with said take-up reel and position said attached tape in a pre-wrap relationship with the hub of said take-up reel.

2. The combination recited in claim 1 in which said guide band is provided with spaced apart sprocket openings and said means for driving said band comprises a sprocket gear and a reversible motor.

3. The combination recited in claim 2 further including means to mount said sprocket gear to said channel for driving engagement with said sprocket openings.

4. The combination recited in claim 3 in which said mounting means is attached to said channel at a point which is remote from said tape path.

5. The combination recited in claim 4 in which said continuous channel is mounted in a plane normal to the axis of said supply reel and take-up reel and spaced above the complex tape path which extends between said reels.

* * * * *